Jan. 18, 1938.  W. C. DEAN  2,105,473

HYDRAULIC STEERING GEAR

Filed Aug. 10, 1934  2 Sheets-Sheet 1

W. C. Dean
INVENTOR

BY Harold Dodd
ATTORNEY

Jan. 18, 1938.　　　W. C. DEAN　　　2,105,473

HYDRAULIC STEERING GEAR

Filed Aug. 10, 1934　　　2 Sheets-Sheet 2

W. C. Dean
INVENTOR

BY Harold Dodd
ATTORNEY

Patented Jan. 18, 1938

2,105,473

UNITED STATES PATENT OFFICE 2,105,473

HYDRAULIC STEERING GEAR

Walter C. Dean, Chevy Chase, Md.

Application August 10, 1934, Serial No. 739,265

6 Claims. (Cl. 60—52)

(Granted under the act of March 3, 1883, as amended April 30, 1928; 370 O. G. 757)

This invention relates to a hydraulic gear especially adapted for use in tugs, yachts and other small vessels. Among the objects of this invention are:

To provide a steering gear adapted for the purpose mentioned which is constructed to permit of rapid shift from hand steering to power steering, or vice versa, utilizing the same steering wheel for both;

To provide a pump for operating the said mechanism, the output of said pump being always in the same direction, and a valve to cooperate with the pump to change the direction of flow of the fluid;

To provide a flywheel for storing energy in the pump and a fan associated therewith for cooling the fluid;

To provide a steering gear wherein the entire power plant and control, including the follow-up mechanism, may be located adjacent the steering wheel, preferably under the pilot house floor.

Figures 1, 2:
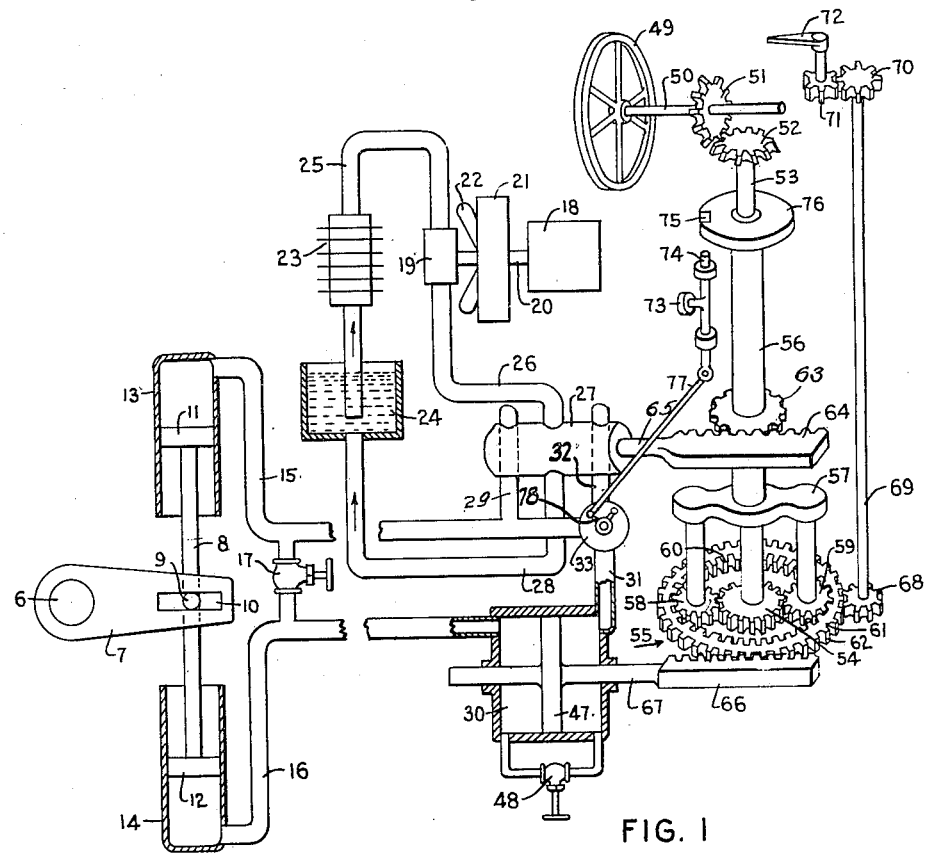
Fig. 1 is a schematic assembly view of an embodiment of my invention.
Fig. 2 is a longitudinal axial section of the valve for controlling the direction of flow of the fluid.

While this invention is particularly described, for purpose of illustration, in connection with a steering gear, it is to be understood that it is adaptable for use in controlling hydraulic mechanism regardless of the purpose of application of the power thereof.

Rudder post 6 has secured to it the tiller 7 which is connected to ram 8 by means of pin 9 on the ram that is slidably disposed in slot 10 in the tiller. The pistons 11 and 12 are secured to the opposite ends of ram 8 and are operatively disposed in cylinders 13 and 14, which cylinders are placed in communication with the remainder of the system by pipes 15 and 16, respectively, a by-pass controlled by valve 17 being provided to place the pipes 15 and 16 in direct communication with each other when desired.

The motor 18 drives positive displacement pump 19, whereof the output is always in the same direction, through shaft 20 upon which is secured a heavy flywheel 21 and a fan 22, the flywheel serving the usual purpose of smoothing out the operation of the pump and the fan 22 being provided to force a stream of air across a heat exchange device 23 through which the fluid, usually oil, passes on its way to the pump. Oil storage tank 24 is connected to pump 19 by a pipe 25 in which is connected the cooling device 23, the discharge from pump 19 being carried by a pipe 26 to valve housing 27 and thence through pipe 28 back to tank 24 when the pump is in operation but no power is being applied to the pistons. The pipe 15 is connected to valve housing 27 by a pipe 29 and pipe 16 is connected to the valve housing through a cylinder 30 and pipes 31 and 32, a three-way valve 33 being connected at the junction of pipes 15, 31 and 32 to permit of forming a closed hydraulic system consisting of cylinders 13, 14 and 30 and pipes 15, 16 and 31, for a purpose hereinafter to be set forth.

The construction of valve housing 27 is shown in Fig. 2. The ports 34 and 35, which are respectively connected to pipes 32 and 29, may be either discharge ports or return ports, depending upon the setting of valve 36 with respect to these ports and to intake port 37 which is connected to pipe 26. Upon the opposite side of valve housing 27 is outlet port 38 that is connected to pipe 28 and is in direct communication with intake port 37 through a cut-away portion 40 in the valve and through a groove 39 formed in the surface of valve 36. It will be observed that at each end of cut-away portion 40 the valve 36 is left full size over a sufficient longitudinal distance to somewhat more than cover the wide inner mouths 41 of ports 34 and 35 when valve 36 is in its central or neutral position. Extending out from port 38 on opposite sides thereof are passages 42 and 43 that terminate at their inner ends in wide mouths 44. Passages 45 and 46 in valve 36 place the passages 42 and 43 in communication with the adjacent end of housing 27, the mouths 44 being provided to prevent shutting off of this communication when valve 36 is shifted longitudinally. From the foregoing it is apparent that when valve 36 is in its neutral position, the fluid from pump 19 passes through pipe 26, port 37, groove 39, port 38 and pipe 28, back to tank 24. If, however, valve 36 be displaced, say toward the right, then intake port 37 is connected by cut-away portion 40 with the port 34, groove 39 is closed by the right one of housing portions 27', and the fluid passes through pipes 32 and 31 to cylinder 30 where it acts upon and displaces the piston 47 toward the left, which in turn displaces fluid from the cylinder through pipe 16 to act upon piston 12 and thus move the tiller 7 toward cylinder 13. The fluid displaced by piston 11 during this movement flows through pipes 15 and 29 and port 35 into housing 27; the valve 36 being displaced toward the right, mouth 41 of port 35 is uncovered and the fluid is free to pass around the left-hand end of valve 36, through passages 46 and 43 to outlet port 38 and thence through pipe 28 back to storage tank 24. It is apparent that displacement of valve 36 toward the left will result in port 35 being the discharge port and port 34 serving for the return of the fluid to valve housing 27. It will be observed that the forces on valve 36 due to the fluid are always balanced. A by-pass controlled by valve 48 permits of equalizing the fluid on opposite sides of piston 47 when necessary.

Steering wheel 49 is connected through shaft 50 and gears 51 and 52 to shaft 53 that has secured to its other end a gear 54 which serves as the sun gear of a differential designated as a whole by numeral 55. Surrounding shaft 53 is a second shaft 56 that carries a spider 57 upon which are rotatably mounted the planet gears 58 and 59 in mesh with gear 54 and also in mesh with the internal gear teeth 60 on annulus 61 which has gear teeth 62 on its outer periphery. Fixed to hollow shaft 56 is a pinion 63 meshed with a rack 64 that is connected to valve rod 65 whereof one end is secured to the valve 36. Rack 66 is meshed with external teeth 62 on annulus 61 and is connected to piston rod 67 of piston 47. By means of pinion 68 meshed with teeth 62, shaft 69 and pinions 70 and 71, a rudder angle indicator 72 is actuated.

It is apparent that when wheel 49 is turned the gear 54 will cause planet pinions 58 and 59 to travel around internal teeth 60 due to the fact that annulus 61 is held against rotation by rack 66. This travel of the planet pinions will rotate pinion 63 which will shift rack 64 and valve 36 connected thereto. The movement of ram 8, resulting from the shifting of valve 36 from its neutral position, will cause a displacement of piston 47 and therefore a displacement of rack 66 which will act upon annulus 61 to impart to gear 63 a rotation opposite and equal to that given it by rotation of steering wheel 49 and thereby a follow-up action is secured which restores valve 36 to its neutral position when tiller 7 has been displaced to the extent indicated by the rotation of wheel 49.

Figure 6:
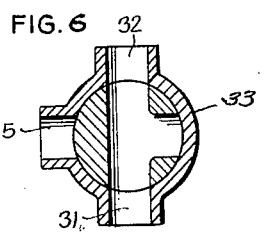
Figs. 6 and 7 are cross sectional views of a three-way valve employed in this invention showing said valve set for power operation and for manual operation of the gear, respectively.
Figure 7:
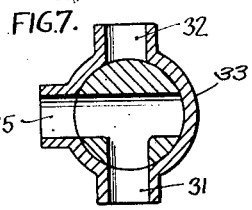

In the preceding description it has been assumed that the settting of three-way valve 33 was such as to connect together pipes 32 and 31 and to close the adjacent end of pipe 15 as shown in Figure 6. If for any reason it is preferable or necessary to operate the tiller by hand power, knob 73 is grasped and pulled upwardly to seat bolt 74 in slot 75 formed in a disk 76 that is fixed on hollow shaft 56, which will prevent rotation of the hollow shaft 56 and thereby hold the valve 36 in its neutral position. A link 77 connects bolt 74 with valve lever 78 so that, simultaneously with the locking of hollow shaft 56, three-way valve 33 is set to place pipes 15 and 31 into communication with each other and to shut them off from communication with valve housing 27 as shown in Figure 7. It is obvious that when hollow shaft 56 is locked against rotation, the planet gears 58 and 59 are restrained against any movement except rotation on their axles and therefore when gear 54 is turned, the planet gears 58 and 59 will act as a speed reducing and power increasing train to rotate the annulus 61 and thereby move piston 47 which will force fluid from cylinder 30 into one of the cylinders 13 and 14 and thereby actuate the tiller 7.

Figure 3:
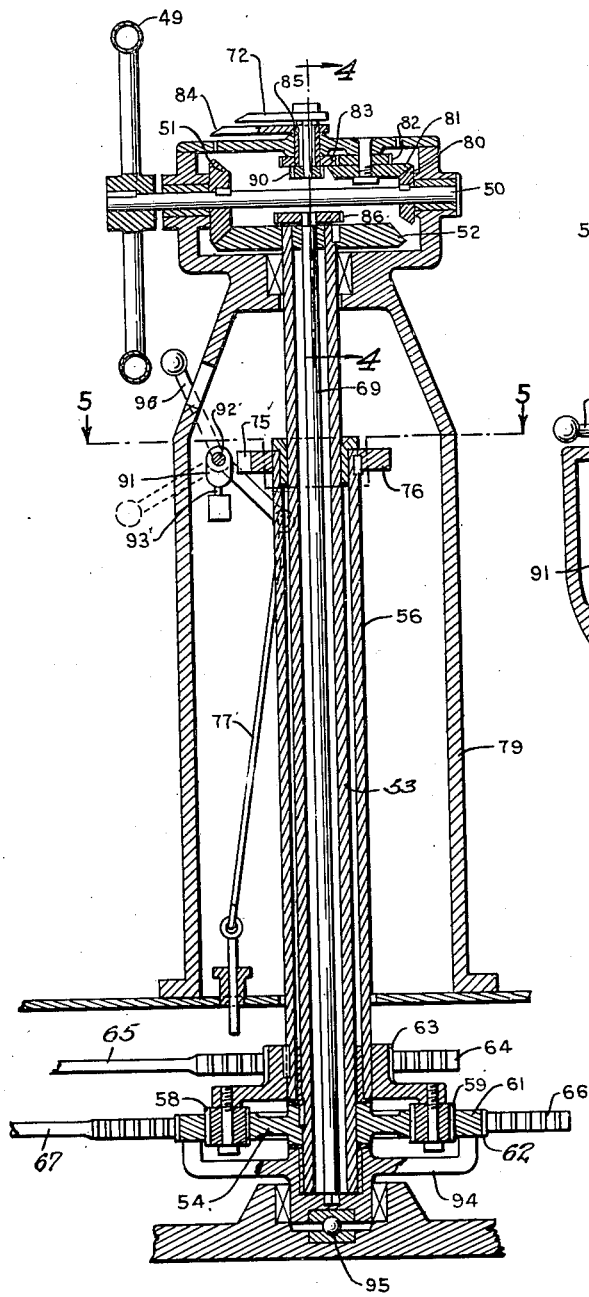
Fig. 3 is a vertical axial section of the steering column.
Figure 4:
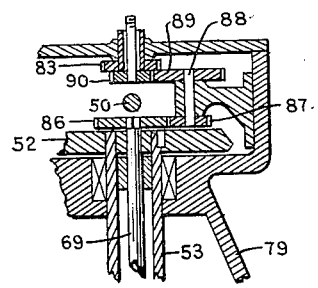
Fig. 4 is a detail view of a portion of the mechanism at the head of the steering column.
Figure 5:
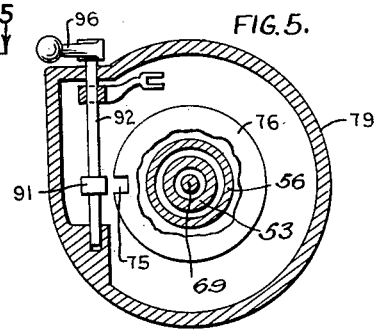
Fig. 5 is a transverse sectional view of the steering column substantially on the line 5—5, Fig. 3.

The somewhat schematic showing of parts in Fig. 1 is amplified in Figs. 3 to 5 inclusive. In Fig. 3 the mechanism is supported by a pedestal 79. A pinion 80 mounted on shaft 50 acts through the gears 81, 82 and 83 to operate the wheel angle indicator 84 carried on sleeve 85 to which gear 83 is secured. The rudder angle indicator 72 is driven from shaft 69 through the gears 86 and 87, shaft 88 and gears 89 and 90. The mechanism for locking hollow shaft 56 against rotation is a cam member 91 on a shaft 92 that is rotatable by means of lever 96 to cause member 91 to engage slot 75 in disk 76. When the member 91 is in the unlocking position it bears against a plunger 93 that closes an electric circuit through motor 18 and thus insures that the motor will be started and given an opportunity to get up to speed before load is placed upon it. The annulus 61 is shown in Fig. 3 as being carried by a spider 94 with which the rudder angle indicator drive shaft 69 has a positive driving connection. A thrust bearing 95 is provided to carry the weight of the several rotatable members included in the steering column.

It should be noted that during the time the pump 19 is operating but the rudder is not being moved the fluid circulates continuously through the pipes and valve housing and hence the temperature of the fluid is greatly raised by the pressure on the fluid and by the friction. When the fluid is hot, owing to its greatly decreased viscosity, there is considerable leakage of the fluid. The heat transfer device 23 is utilized to keep the fluid cool and so prevent the aforesaid losses, which may become so great as seriously to impair the operation of the mechanism. The problem of cooling the fluid in systems using a variable stroke pump does not arise, since there is no circulation of the fluid except when the mechanism is actually transmitting power.

The invention herein described may be manufactured and used by or for the Government of the United States of America for governmental purposes, without the payment of any royalties thereon.

I claim:

1. The combination with a double acting hydraulic ram, of means to supply fluid under pressure constantly in one direction, a valve operatively connected to said means, said valve having an element selectively movable to cause the fluid merely to circulate in said means or to act upon said ram to move it in either direction, a toothed rack connected to said element, a hollow shaft, a pinion on said shaft meshed with said rack, planet pinions carried by said hollow shaft, a second shaft extending through said hollow shaft, a pinion on said second shaft meshed with said planet pinions, an element having internal gear teeth meshed with said planet pinions and external gear teeth, a rack meshed with said external gear teeth, pipes connecting said valve to said ram, a piston operatively disposed to be acted upon by fluid pressure in one of said pipes and connected to the last mentioned rack, and manual means to actuate said second shaft.

2. The combination with a double acting hydraulic ram, of means to supply fluid under pressure constantly in one direction, a valve operatively connected to said means, said valve having an element selectively movable to cause the fluid merely to circulate in said means or to act upon said ram to move it in either direction, a toothed rack connected to said element, a hollow shaft, a pinion on said shaft meshed with said rack, planet pinions carried by said hollow shaft, a second shaft extending through said hollow shaft, a pinion on said second shaft meshed with said planet pinions, an element having internal gear teeth meshed with said planet pinions and external gear teeth, a rack meshed with said external gear teeth, pipes connecting said valve to said ram, a piston operatively disposed to be acted upon by fluid pressure in one of said pipes and connected to the last mentioned rack, means to by-pass fluid from one side of said piston to the other side thereof, and manual means to actuate said second shaft.

3. The combination with a double acting hydraulic ram, of means to supply fluid under pressure constantly in one direction, means selectively operable to apply said fluid to actuate said ram in either direction or to cause said fluid merely to circulate in said means, a piston interposed in the path of the fluid between said ram and said fluid supply means to be actuated by movement of said fluid, means operatively connected to both said piston and to said selectively operable means, said last mentioned means including a differential gear, a locking element movable to lock against rotation that portion of the last mentioned means directly connected with said selectively operable means, a valve to form a closed fluid system that includes said piston and said ram but excludes said selectively operable means, and means connecting the said valve and said locking element to move said valve to form such closed system when said locking element is in the locking position.

4. The combination with a double acting hydraulic ram, of means forming substantially a closed hydraulic system including a pump having a constant direction of output and a valve settable to cause fluid from said pump either to circulate in said closed system or to actuate said ram in either direction, said valve comprising a housing having an outlet port and an inlet port connected to said closed system and two discharge ports each connected to one end of the ram mechanism, each discharge port having an elongated inner mouth, there being a passage extending longitudinally of the housing from each side of said outlet port, said passages opening into the housing through an elongated mouth, and a valve piston in said housing, said piston being of a length slightly greater than the distance between the outer ends of the mouths of the discharge ports and having a cut-away portion of slightly less length than the distance between the inner ends of the mouths of the discharge ports and having also a circumferential groove communicating with the cut-away portion, said groove being in communication with the outlet port when the piston is centrally positioned in the housing but cut off therefrom when the piston is longitudinally shifted, said cut-away portion placing said inlet port in communication with one or the other of the discharge ports when the piston is shifted longitudinally, and manually operable means to shift the piston longitudinally.

5. The combination with hydraulic power applying mechanism operable in either of two directions, of means to supply fluid under pressure to said mechanism, means selectively adjustable to cause such fluid to circulate in a system apart from said mechanism or to actuate said mechanism in either of the said two directions, a supporting structure, a first hollow shaft rotatably mounted therein, a second shaft mounted to rotate in said first hollow shaft, a gear on said second shaft, planetary gears carried by said shaft meshed with said gear, an annulus rotatably mounted on said second shaft having internal gear teeth meshed with said planetary gears and having also external gear teeth, a toothed rack meshed with said external gear teeth, a gear carried by said first shaft, a toothed rack meshed with said last named gear and operatively connected to said selectively adjustable means, manually operable means operatively connected to said second shaft, a first index, means operatively connecting said index to said annulus whereby said index is caused to indicate the extent and direction of movement of said mechanism, a second index, and means operatively connecting said second index to said manually operable means to cause said second index to indicate the extent and direction of movement of said manually operable means.

6. The combination with a hydraulic power device having a reciprocable element, of means to supply fluid under pressure in but one direction of output, means including a valve to carry fluid to and from the first said means, fluid carrying means connecting said valve and said device, said valve having a selectively settable member to apply fluid to said device to move said element in either direction or to cause the fluid merely to circulate in the second mentioned means, manually operable means including a differential device to set said settable member as aforesaid, a movable element disposed in the path of fluid between said valve and said hydraulic device to be moved by flow of fluid along said path, the movement thereof being proportionate to the extent of such flow, means connecting said movable element to said differential device whereby said settable member is moved to stop the said flow, and means to lock a portion of said differential device and simultaneously establish a closed hydraulic system that includes said hydraulic device and said movable member, thereby making said hydraulic device actuatable directly by said manually operable means.

WALTER C. DEAN.